Jan. 31, 1967 H. WEILL 3,300,842

METHOD OF MAKING DELAY LINE STRUCTURES

Filed June 1, 1964 4 Sheets-Sheet 1

INVENTOR:
Henri WEILL

BY Paul M. Craig, Jr.
ATTORNEY

INVENTOR:
Henri WEILL

BY Paul M. Craig, Jr.
ATTORNEY

INVENTOR:
Henri WEILL

BY Paul M. Craig, Jr.
ATTORNEY

INVENTOR:
Henri WEILL
BY Paul M. Craig, Jr.
ATTORNEY 3,300,842
METHOD OF MAKING DELAY LINE STRUCTURES
Henri Weill, Paris, France, assignor to CSF—Compagnie Generale de Telegraphie Sans Fil, Paris, France
Filed June 1, 1964, Ser. No. 371,417
Claims priority, application France, June 12, 1963, 937,795
5 Claims. (Cl. 29—155.5)

Figure 1:
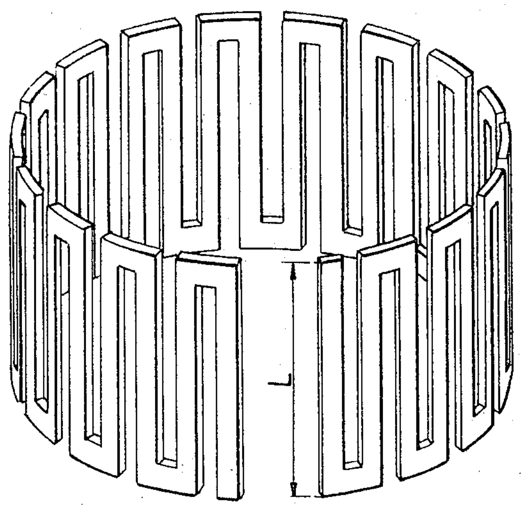
Figure 2:
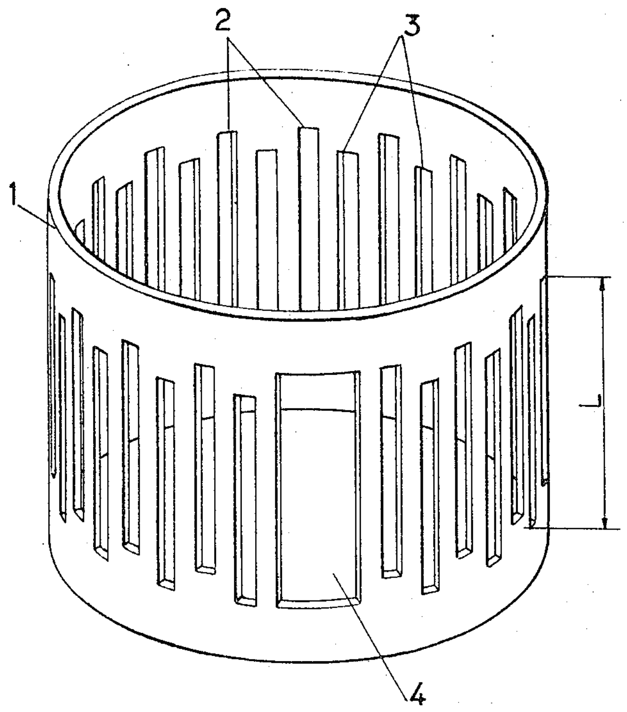
Figure 3:
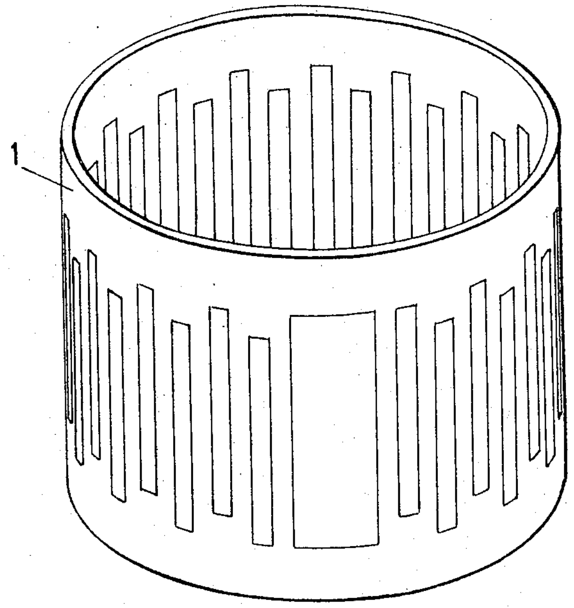
Figure 4:
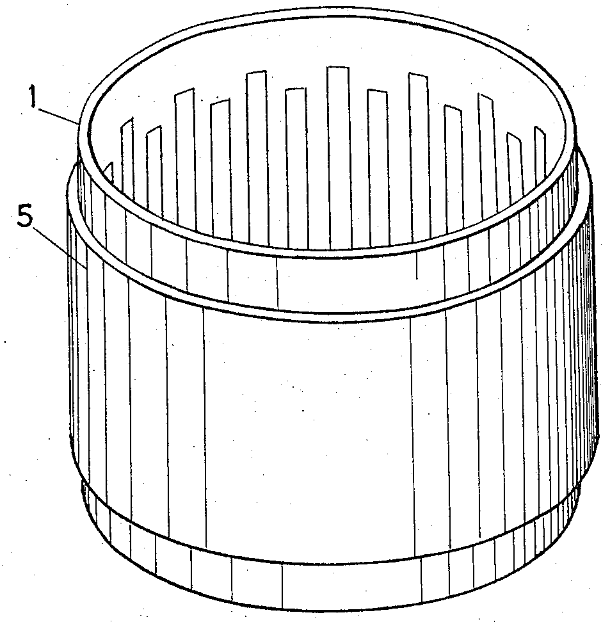

The present invention relates to hyper-frequency tubes with crossed fields, of cylindrical form, and has for its object a process of manufacture of delay lines for these tubes.

In the cylindrical structures, the delay line is currently fixed on an insulating support, of cylindrical shape, placed on the inside of a cylindrical envelope of metal, called backplate.

The mutual fixing or securing of the three elements consisting of delay line, insulating support and envelope or backplate, with the aid of brazing, is difficult and presents additionally numerous inconveniences. It is impossible to inspect rigorously the desired sizes, diffusion of the brazing material into the insulation, formation of mechanical irregularities in the assembly, etc. For these reasons, one has proposed methods utilizing the techniques of photography and of galvanoplasty or electroplating, but these methods permit the realization of only lines of extremely slight thickness, consequently able to dissipate only very limited thermal energies.

The present invention has as its object a process of manufacture permitting to obviate the inconveniences of the prior art techniques known to date.

According to the present invention, the process of manufacture of a cylindrical structure, composed of a delay line extended over an insulating layer of cylindrical form, placed on the inside of a cylindrical envelope of metal, comprises the following steps:

(1) Providing a series of apertures corresponding to the delay line within a hollow metallic cylinder, designated hereinafter as "line-support," having a length greater than the width of the line;

(2) Provisionally filling the apertures of the cylindrical line-support with moldable material;

(3) Depositing by any appropriate process, a layer of insulating material on the external face of the cylindrical line-support;

(4) Machining and truing the line-support cylinder covered with insulating material to an external diameter slightly larger than the internal diameter of the cylindrical envelope;

(5) Shrink-fitting the cylindrical envelope over the line-support cylinder, covered with insulation, by heating the cylindrical envelope up to a sufficient expansion in order to permit to effectuate this fitting and assembly, with the line-support cylinder maintained cold;

(6) Re-machining the inside of the block thus realized;

(7) Cutting the extreme portions of the line-support cylinder in such a manner as to leave of the original cylinder only the delay line, properly speaking;

(8) Eliminating by any appropriate process, either chemical or mechanical, the moldable material filling the apertures of the delay line.

Accordingly, it is an object of the present invention to provide a method of manufacturing delay lines which obviates, in an effective manner and by simple means, the shortcomings encountered with the prior art methods.

It is another object of the present invention to provide a process for making delay lines for use in hyper-frequency tubes which is simple to carry out and provides a rigid structure, yet obviates the need for brazing operations.

Still another object of the present invention resides in the provision of a method for making delay lines for hyper-frequency tubes which not only permits maintaining the desired shape of the line within very narrow tolerances, but also assures a mechanically strong line without irregularities and without diffusion of any foreign materials, particularly in the insulation thereof.

A still further object of the present invention resides in the provision of a method for manufacturing delay lines for hyper-frequency tubes which permits the realization of delay lines capable of dissipating substantial thermal energies notwithstanding the small dimensions of the line to operate at the hyper-frequencies for which the delay is designed.

Figure 5:
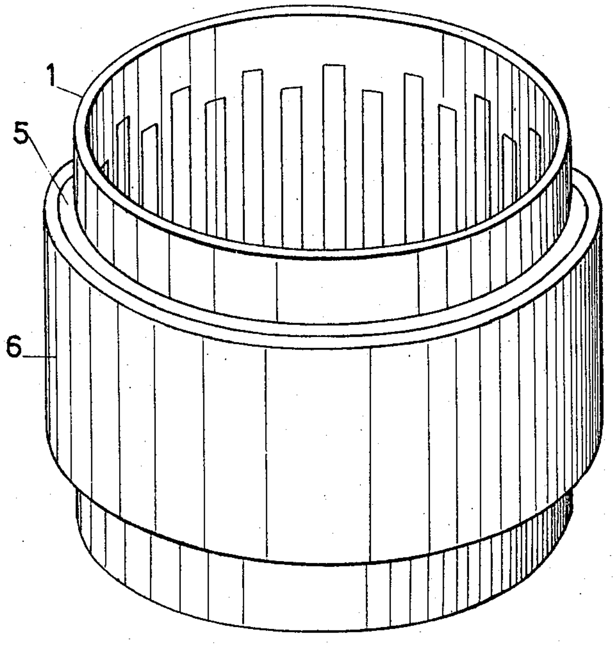
Figure 6:
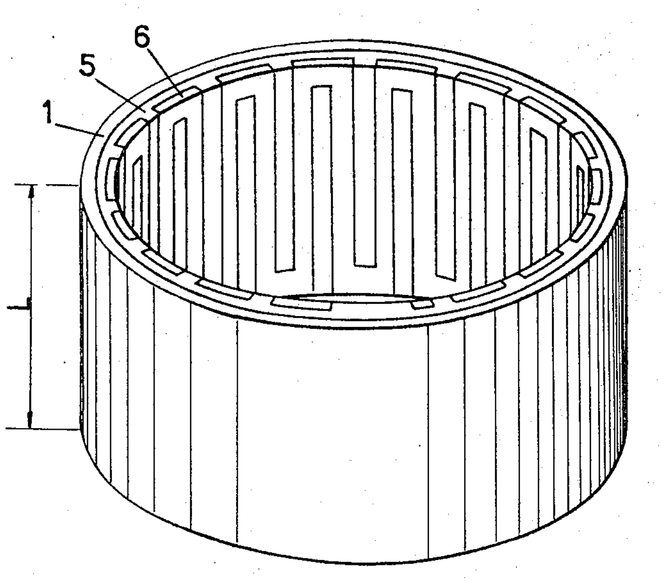
Figure 7:
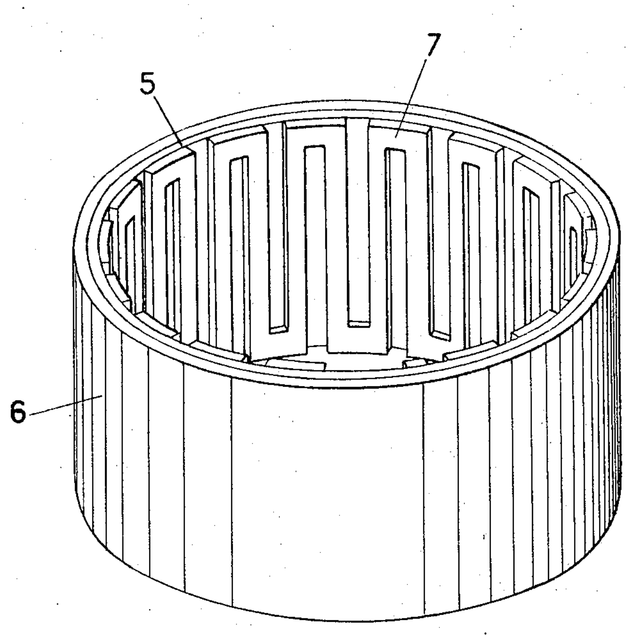

These and other objects, features and advantages of the present invention will become more obvious from the following description when taken in connection with the accompanying drawing which shows, for purposes of illustration only, one embodiment in accordance with the present invention, and wherein FIGURE 1 shows, in a non-limitative manner for purposes of illustration only, a perspective view of one type of delay line realizable in accordance with the present invention;

FIGURES 2 through 6 are perspective views, similar to FIGURE 1, and illustrating successive phases in the manufacture of the line in accordance with the present invention, and FIGURE 7 shows a perspective view of the finished and assembled delay line in accordance with the present invention.

In all the figures, the same elements are designated by the same reference numerals.

Among the various types of cylindrical delay lines, realizable by the process of the present invention, there is considered herein, for illustrative purposes only, the meander-type line shown in FIGURE 1.

For realizing this line, one provides within a metallic cylinder 1 (FIGURE 2) over a width L equal to that of the line, rectanguar apertures 2 and 3 of identical dimensions, but alternately offset toward the top and toward the bottom, and a rectangular aperture 4 of a height equal to L.

After having filled the apertures 2, 3 and 4 (FIGURE 3) with a suitable moldable material of any appropriate conventional type, sufficiently resistant mechanically, one deposits on the external face of the line-support cylinder 1, by any appropriate conventional process, a dielectric layer 5 (FIGURE 4) of a width equal to or slightly less than the width L of the line. The dielectric material 5 is chosen among those materials having a good thermal conductivity.

The block formed by the line-support cylinder 1 and its insulating cover 5 is thereupon machined and trued to an external diameter slightly greater than the internal diameter of the cylindrical envelope 6 made of metal (FIGURE 5). One proceeds thereafter to the emplacement and fitting of the block 1–5 within the cylinder 6 by heating the latter, for example, by high frequency energy, and by maintaining the cylinder 1 cold until the expansion of the cylinder 6 is sufficient to permit this emplacement and assembly.

After cooling, the cylinder 6 reassumes naturally its original dimension and the insulating layer 5 finds itself strongly compressed between the cylinder 1 and 6 (FIGURE 5).

In the succeeding operation, one cuts the extreme bands of the assembly 1–5–6 on both sides of the central band of width L, corresponding to that of the line, and one thus obtains the assembly illustrated in FIGURE 6. This assembly comprises still the moldable material in the apertures 2, 3 and 4.

It suffices thereupon to eliminate the moldable material by any appropriate known means to obtain the final form of the structure, shown in FIGURE 7, in which one sees the line 7 corresponding to that of FIGURE 1, extended along the dielectric layer 5, on the inside of the metallic cylinder 6.

It may be seen that one thus obtains the solid and rigid structure within which one may give to the elements any desired thickness. The delay line and the dielectric layer are always firmly and strongly secured therein by the external cylinder constituting the backplate. When, in operation within an electron tube, the delay line heats up, the external cylinder may rest at a much lower temperature, or eventually may be cooled by any cooling system, and the banding or tightening only becomes more pronounced.

Owing to the absence of any brazing in the structure, the danger of mechanical and electrical irregularities in the assembly is avoided, and the sizes of all the elements may be respected with a very high precision, impossible to attain in the processes utilized to date.

In one realization of a meander-type line, executed according to the process described above, the length of the line was 25 mm., the width of the meander 1 mm., the thickness of the line-support cylinder 0.5 mm., and the thickness of the dielectric 1 mm. The two cylinders were of copper and the dielectric material was alumina, $Al_2O_3$, but one should note that in order to have a better thermal conductivity, essential for the dissipation of heat across the dielectric, there exists interest to utilize beryllium oxide.

The adherence of the dielectric on the line support cylinder has been obtained by projection (by plasma blasting) of the material in the liquid state and sudden cooling at the contact with the cylinder maintained cold during the entire operation. The cylinder was rendered preliminarily slightly rough to assure a better adherence.

For the provisional filling of the apertures of the line-support cylinder, a thermo-injectable material has been utilized.

While I have shown and described one embodiment in accordance with the present invention, it is understood that the same is not limited thereto, but is susceptible of numerous changes and modifications as known to a person skilled in the art. For example, the present invention permits the realization of different types of cylindrical delay lines, and diverse variations in the execution are well within the scope of a person skilled in the art. Thus, for example, the insulating material need not form a continuous layer, but may be disposed solely facing elements constituting the delay line, properly speaking.

Thus, it is obvious that the present invention is susceptible of numerous changes and modifications within the spirit and scope of the present invention, and I therefore do not wish to be limited to the details shown and described herin, but intend to cover all such changes and modifications as are encompassed by the scope of the appended claims.

I claim:

1. Process of manufacturing a cylindrical high frequency delay line structure which includes a cylindrical metal envelope, an electrically insulating layer on the inner surface of the envelope, and an electric signal wave retarding structure on the insulating layer, said process comprising the steps of:

providing in a hollow metal cylinder a series of apertures shaped so as to correspond to the gaps of the wave retarding structure, the length of the cylinder being larger than the width of the wave retarding structure, filling the said apertures with a moldable substance, depositing a layer of insulating material on the outer surface of said hollow cylinder, adjusting the outer diameter of said insulating layer to be somewhat larger than the inner diameter of said cylindrical envelope, assembling and fixing said hollow cylinder together with the insulating coating thereof on the inside of said cylindrical envelope by heating the envelope while maintaining the hollow cylinder cold, inserting the hollow cylinder into the heated envelope and subsequently allowing the envelope to cool to produce a shrink fit, cutting off the extremities of said hollow cylinder so as to form the said electric signal wave retarding structure, and eliminating the said moldable substance from said apertures.

2. Process of manufacturing a cylindrical high frequency delay line structure which includes a cylindrical metal envelope, an electrically insulating layer on the inner surface of the envelope, and an electric signal wave retarding structure on the insulating layer, said process comprising the steps of:

providing in a hollow metal cylinder a series of apertures shaped so as to correspond to the gaps of the wave retarding structure, the length of the cylinder being larger than the width of the wave retarding structure, filling the said apertures with a moldable substance, depositing a layer of insulating material on the outer surface of said hollow cylinder, assembling and fixing said hollow cylinder together with the insulating coating thereof on the inside of said cylindrical envelope, cutting off the extremities of said hollow cylinder so as to form the said electric signal wave retarding structure, and eliminating the said moldable substance from said apertures.

3. A method for manufacturing a high frequency delay line assembly which includes a metallic element, an electrically insulating layer on one side thereof in contact with the metallic element, and an electric signal wave delay line structure on the other side of the insulating layer, said method comprising the steps of:

providing in a metal member a series of apertures shaped so as to correspond to the gaps of the delay line, the length of the metal member being larger than the width of the delay line, filling the said apertures with a moldable substance, depositing a layer of insulating material on the surface of said metal member, assembling and fixing said metal member together with the insulating coating on said metallic element, and cutting off the extremities of said metallic member so as to form the said high frequency delay line.

4. A method for manufacturing a high frequency delay line assembly which includes an outer hollow metallic element, an electrically insulating layer on one side thereof in contact with the metallic element, and an electric signal wave delay line structure on the other side of the insulating layer, said method comprising the steps of:

providing in a hollow metal member a series of apertures shaped so as to correspond to the gaps of the delay line, the length of the metal member being larger than the width of the delay line, filling the said apertures with a moldable substance, depositing a layer of insulating material on the outer surface of said metal member, adjusting the outer diameter of said insulating layer to be somewhat larger than the inner diameter of said outer metallic element, assembling and fixing said metal member together with the insulating coating onto the inside of said metallic element, cutting off the extremities of said metallic member so as to form the said high frequency delay line, and eliminating the said moldable substance from said apertures.

5. A method for manufacturing a high frequency delay line assembly which includes an outer hollow metallic element, an electrically insulating layer on one side thereof in contact with the metallic element, and an electric signal wave delay line structure on the other side of the insulating layer, said method comprising the steps of:
   providing in a hollow metal member a series of apertures shaped so as to correspond to the gaps of the delay line, the length of the metal member being larger than the width of the delay line.
   filling the said apertures with a moldable substance,
   depositing a layer of insulating material on the outer surface of said metal member,
   adjusting the outer diameter of said insulating layer to be somewhat larger than the inner diameter of said outer metallic element, assembling and fixing by shrink-fitting said metal member together with the insulating coating onto the inside of said metallic element,
   cutting off the extremities of said metallic member so as to form the said high frequency delay line,
   and eliminating the said moldable substance from said apertures.

References Cited by the Examiner

RCA Tech. Note No. 94, received August 1958, one page.

JOHN F. CAMPBELL, *Primary Examiner.*

WILLIAM I. BROOKS, *Examiner.*